US011782717B2

(12) United States Patent
Jones

(10) Patent No.: US 11,782,717 B2
(45) Date of Patent: *Oct. 10, 2023

(54) EMBEDDED COMPUTATION INSTRUCTION PERFORMANCE PROFILING

(71) Applicant: Seagate Technology LLC, Fremont, CA (US)

(72) Inventor: Marc Tim Jones, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,605

(22) Filed: Aug. 12, 2022

(65) Prior Publication Data

US 2022/0391211 A1 Dec. 8, 2022

Related U.S. Application Data

(63) Continuation of application No. 17/162,957, filed on Jan. 29, 2021, now Pat. No. 11,442,733.

(51) Int. Cl.
*G06F 9/30* (2018.01)
*G06F 9/32* (2018.01)
*G06F 13/42* (2006.01)
*G06F 9/48* (2006.01)

(52) U.S. Cl.
CPC .......... *G06F 9/30145* (2013.01); *G06F 9/321* (2013.01); *G06F 9/4837* (2013.01); *G06F 13/4221* (2013.01); *G06F 2213/0026* (2013.01)

(58) Field of Classification Search
None
See application file for complete search history.

(56) References Cited

U.S. PATENT DOCUMENTS 10,915,469 B2 2/2021 Olarig et al.
2019/0278720 A1 9/2019 Olarig et al.
2020/0104237 A1 4/2020 Rao et al.
(Continued)

FOREIGN PATENT DOCUMENTS

CN 107632918 A 1/2018

OTHER PUBLICATIONS

'Enabling Cost-effective Data Processing with Smart SSD' by Yangwook Kang et al., In 2013 IEEE 29th symposium on mass storage systems and technologies (MSST), pp. 1-12. IEEE, 2013. (Year: 2013).*

(Continued)

*Primary Examiner* — Steven G Snyder
(74) *Attorney, Agent, or Firm* — HOLZER PATEL DRENNAN

(57) ABSTRACT

The technology disclosed herein pertains to a system and method for profiling performance of an embedded computation instruction set (CIS), the method including receiving a profiling component to a computational storage device (CSD), the profiling component being configured to measure one or more execution parameters of a computational instruction set (CIS), executing the CIS at a program slot in a computational storage processor of the CSD, monitoring the execution of the CIS to generate a log of the execution parameters of the CIS, and communicating the log to a host in response to receiving a get-log page command.

20 Claims, 5 Drawing Sheets

(56) References Cited

U.S. PATENT DOCUMENTS

2020/0274952 A1    8/2020   Waskiewicz et al.

OTHER PUBLICATIONS

"NVM Express—Revision 1.2.1", Jun. 5, 2016.
"SmartSSD Computational Storage Drive—Product Brief", archived from Xilinx.com, Dec. 3, 2020.
Torabzadehkashi, Mahdi, et al., "Computational storage: an efficient and scalable platform for big data and HPC applications", Journal of Big Data, 2019.

* cited by examiner

EMBEDDED COMPUTATION INSTRUCTION PERFORMANCE PROFILING

CROSS-REFERENCE TO RELATED APPLICATIONS

This application is a Continuation of and takes priority from pending patent application Ser. No. 17/162,957 which was filed on Jan. 29, 2021, entitled Embedded Computation Instruction Performance Profiling. The disclosure set forth in the referenced application is incorporated herein by reference in its entirety.

BACKGROUND

A computational storage device (CSD) is a storage device that provides persistent data storage and computational services. Computational storage is about coupling compute and storage to run applications locally on the data, reducing the processing required on the remote server, and reducing data movement. To do that, a processor on the drive is dedicated to processing the data directly on that drive, which allows the remote host processor to work on other tasks. Berkeley Packet Filter (BPF) is a technology used in certain CSD systems for processing data. BPF is a virtual instruction set that has the capability to run anywhere through either emulation or translation to a native instruction set.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system and method for profiling performance of an embedded computation instruction set (CIS), the method including receiving a profiling component to a computational storage device (CSD), the profiling component being configured to measure one or more execution parameters of a computational instruction set (CIS), executing the CIS at a program slot in a computational storage processor of the CSD, monitoring the execution of the CIS to generate a log of the execution parameters of the CIS, and communicating the log to a host in response to receiving a get-log page command.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

A computational storage device (CSD) is a storage device that provides persistent data storage and computational services. Computational storage is about coupling compute and storage to run applications locally on the data, reducing the processing required on the remote server, and reducing data movement. To do that, a processor on the drive is dedicated to processing the data directly on that drive, which allows the remote host processor to work on other tasks. Berkeley Packet Filter (BPF) is a technology used in certain CSD systems for processing data. BPF is a virtual instruction set that has the capability to run anywhere through either emulation or translation to a native instruction set.

eBPF is a relatively simple instruction set, but covers instructions necessary for complex program development. eBPF may be interpreted on the target device or translated into the native instruction set for performance (since interpretation is ultimately slower than native execution. However, in some implementations, eBPF is suboptimal for translation to modern embedded processors such as ARM, RISC-V, etc., which makes it less than ideal for computational storage applications.

Some implementations of the CSD disclosed herein may implement interpretation of the eBPF instructions on the native architecture, which represents the slowest form of computational storage. Alternative implementations may implement translation where the eBPF instructions are translated into the native instruction set of the computational storage processors such as ARM, RISC-V, etc. The technology disclosed herein is directed to using a computational instruction set (CIS) such as the eBPF within the CSD and optimizing the eBPF before generating a native instruction set (such as an ARM instruction set, an RISC instruction set, etc.). Specifically, the implementations disclosed herein are directed towards using a computational instruction set (CIP) such as enhanced Berkeley Packet Filter (eBPF) within the CSD and profiling the performance of the CIP to generate one or more CIP execution parameters. In example implementations, these parameters may include, for example, (a) total execution time of the program, (b) number of times each instruction is executed, (c) the percentage taken for every branch in the program, (d) number of DRAM memory accesses, etc.

Figure 1:
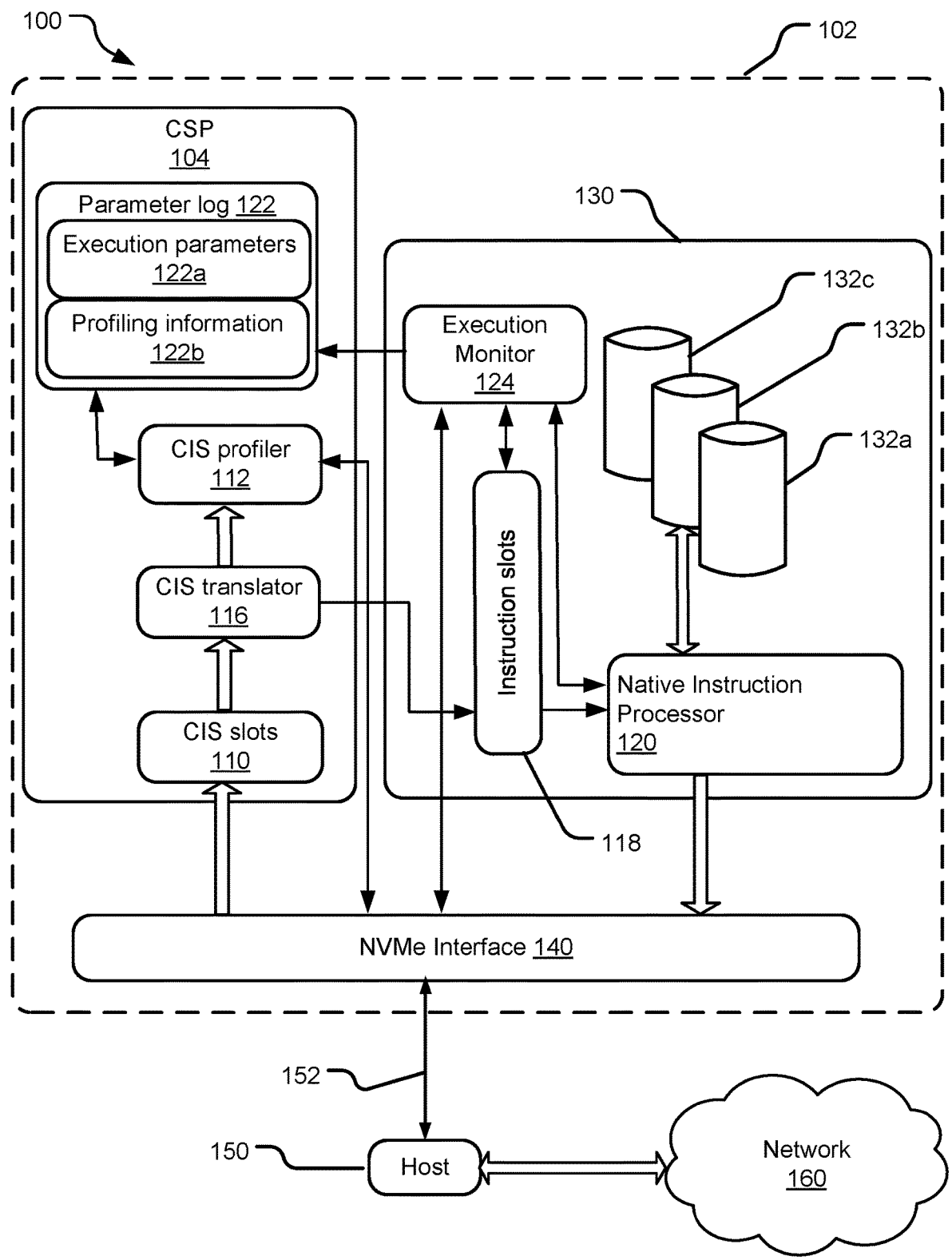
FIG. 1 illustrates a schematic diagram of an example system for profiling performance of an embedded computing instruction set (CIS) on a computational storage device (CSD).

FIG. 1 illustrates a schematic diagram of a system 100 for profiling performance of an embedded computing instruction set (CIS) on a computational storage device (CSD) 102.

The CSD 102 may include a memory 130 implemented using hard disc drives (HDDs), solid state drives (SSDs), hybrid drives, etc. In the illustrated implementation, the memory 130 is implemented using HDDs 132a-132c (HDDs 132). The CSD 102 allows processing data on the HDDs 132 where the data is stored, enabling the generation of insights and value directly from the data stored on the HDDs 132. Such smart processing of data at the CSD 102 reduced the movement of large amounts of data to external processing and delivers numerous benefits including reduced latency, reduced bandwidth usage, increased security, energy savings, etc.

The CSD 102 provides such processing of data at the storage by using a computational storage processor (CSP) 104 working with the memory 130. The CSD 102 may include an interface to communicate with a host 150. For example, such an interface is an NVMe interface 140 that communicates with the host 150 using a PCIe interface 152. The host 150 may be a server or other computing system that maybe implemented in the vicinity of the CSD 102 and may be communicatively connected to a network 160, such as the Internet.

The host 150 may receive from the network 150 or develop one or more computing instruction sets (CISs) for processing data on the CSD 102. An example of such as CIS is an enhanced Berkeley Packet Filter (eBPF). The CISs may provide interface to the data on the memory 130 at the data link layer and may be configured to process the data at the data link layer. The NVMe interface 140 may download such CIS from the host using a download command such as an NVMe download command. Once the NVMe interface 140 downloads one or more CIS from the host 150, the CIS is stored at a CIS slot 110 on the CSP 104.

A CIS profiler 112 may be used to generate profile of the CIS and its performance. In one implementation, the CIS profiler 112 may include one or more instructions of a profiling component that, when executed, generates the CIS profile by simulating the processing of the CIS. Alternatively, the CIS profiler 112 generates the profile of the CIS my making various measurements of one or more of the CIS parameters during real time execution of the CIS. Specifically, the CIS profiler 112 may be implemented using various computer program instructions that may be processed on a CPU or other processor. As part of CIS profile generation, the CIS profiler 112 may generate a parameter log 122 that stores values of various CIS parameters through its execution.

In one implementation, a CIS translator 116 translates the CIS to native instruction set, such as an instruction set for an ARM processor, an instruction set for an RISC-V processor, etc. The native instruction set is allocated to instruction slots 118 to operate on the native instruction processor 120 to process data from the memory 130. In one implementation, an execution monitor 124 monitors the execution of the native instruction set of the CIS at the native instruction processor 120 to collect various execution parameters of the CIS. For example, the execution monitor 124 may monitor (a) total execution time of the program, (b) number of times each instruction is executed, (c) the percentage taken for every branch in the program, (d) number of DRAM memory accesses, etc.

The execution monitor 124 may be implemented using computer programming instructions that are executable on a CPU or other processor. In one implementation, the execution monitor saves the values of the execution parameters to a parameter log 122. For example, the parameter log 122 may store the values of the execution parameters for a predetermined time period, over a life cycle of the CIS execution on the native instruction processor 120, etc. The CIS profiler 112 may communicate with the parameter log 122 to specify which execution parameters are to be aggregated, how long such parameters are to be saved, to retrieve the execution parameters at predetermined time intervals, etc.

In one implementation, the CIS profiler 112 and the execution monitor 124 may be optionally enabled by an NVMe set-feature command from the host 150 via the NVMe interface 140. Similarly, once execution of the CIS program is complete, an NVMe get-log-page command from the NVMe interface 140 to the CIS profiler 112 may be used to collect the execution parameters 122a and other profiling information 122b that is stored in the parameter log 122. As the CSP 104 and its memory, including the parameter log 122, is visible to the host 150 through the interface 152, the host 150 may also directly access the parameter log 122. For example, such profiling information 122b may include the total execution time of the CIS, the number of times each instruction is executed, the percentage time takes for every branch in the CIS, The number of times various functions of the CIS are called and the minimum/maximum/average execution times of these CIS functions, the range of memory addressed by the CIS program, the number of DRAM memory accesses during execution of the CIS, cache utilization ratio (such as for example, ratio of L1 cache references vs. DRAM references), etc. In one implementation, the execution parameters 122a and the profiling information 122b may be used to optimize the CIS for higher performance.

Figure 2:
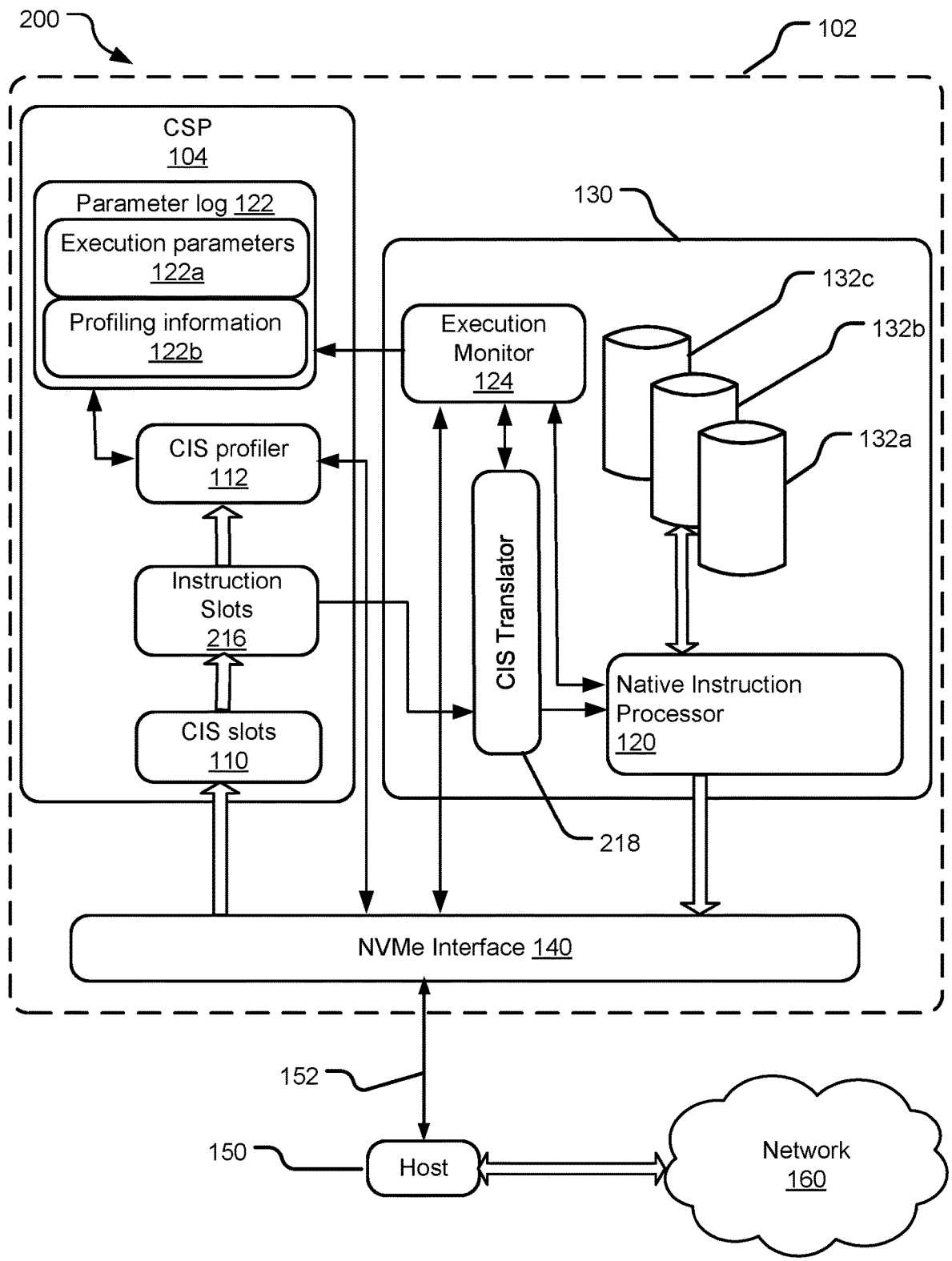
FIG. 2 illustrates an alternative schematic diagram of an example system for profiling performance of an embedded computing instruction set (CIS) on a computational storage device (CSD).

FIG. 2 illustrates an alternative schematic diagram of a system 200 for profiling performance of an embedded computing instruction set (CIS) on a computational storage device (CSD). One or more features of the system 200 are substantially similar to the elements of respective system 100 disclosed in FIG. 1. However, while for system 100, the optimized CIS is translated to native instruction set before being allocated to native instruction slots 118, in the system 200, the CIS is allocated to CIS instruction slots 216 and subsequently it is translated by a CIS translator 218 in real time for the native instruction processor 120.

Specifically, in such implementation, the profiling process by the CIS profiler varies in that the counting the segments of a program executed along with branches is performed using in-code instrumentation to provide trace information that can be stored in the parameter log 122. Alternatively, the CIS profiler 112 may also take advantage of capabilities of the native instruction processor 120, such as an ARM Performance Monitor Unit (PMU) that provides counters for trace information, to gather this information in lieu of in-code instrumentation. Such trace information can be sent back to the host 150. Alternatively, the trace information can be injected into the native program during CIS translation by the CIS translator.

Figure 3:
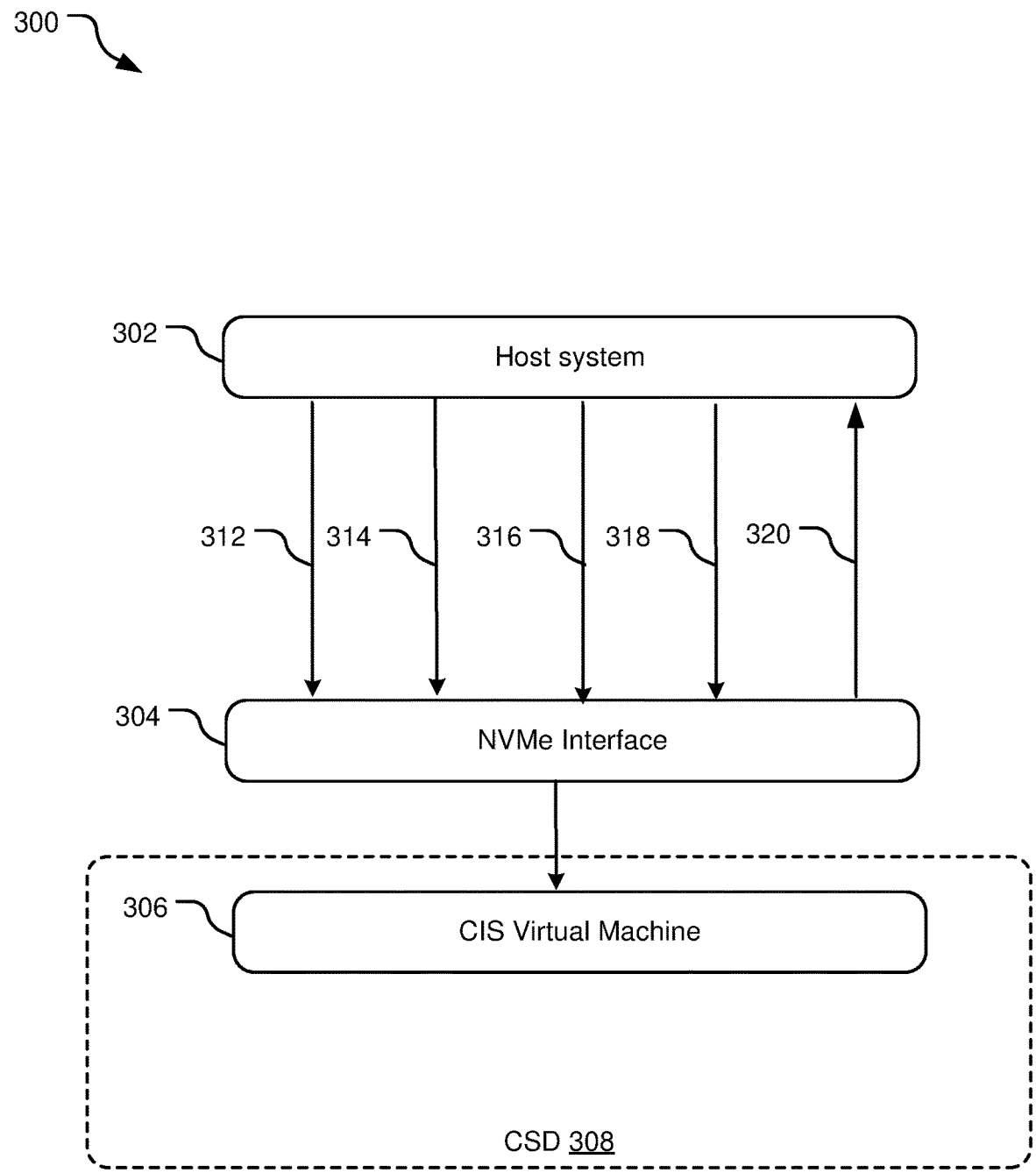
FIG. 3 illustrates example operations for profiling performance of an embedded computing instruction set (CIS) on a computational storage device (CSD).

FIG. 3 illustrates a state diagram 300 for profiling performance of an embedded computing instruction set (CIS) on a computational storage device (CSD). Specifically, FIG. 3 illustrates a host system 302 interacting with a CIS virtual machine 306 on a CSD 308 via an NVMe interface 304. At 312, the host system 302 may cause a CIS to be downloaded and committed to a CIS slot in the CSD 308. Subsequently, at 314, an NVMe command, such as an NVMe set-feature command can be used to set the profiling features, such as parameters to be traced, to a profiler in the CSD 308.

At 316, an execute CIS program command may be sent via the NVMe interface 304 to initiate the execution of the CIS. During the CIS execution, various trace information including execution parameters are collected at a parameter log in the CSD 308. At 318, a get-log-page command may be sent to the CSD 308 to collect the execution parameters, which are communicated to the host at 320.

Figure 4:
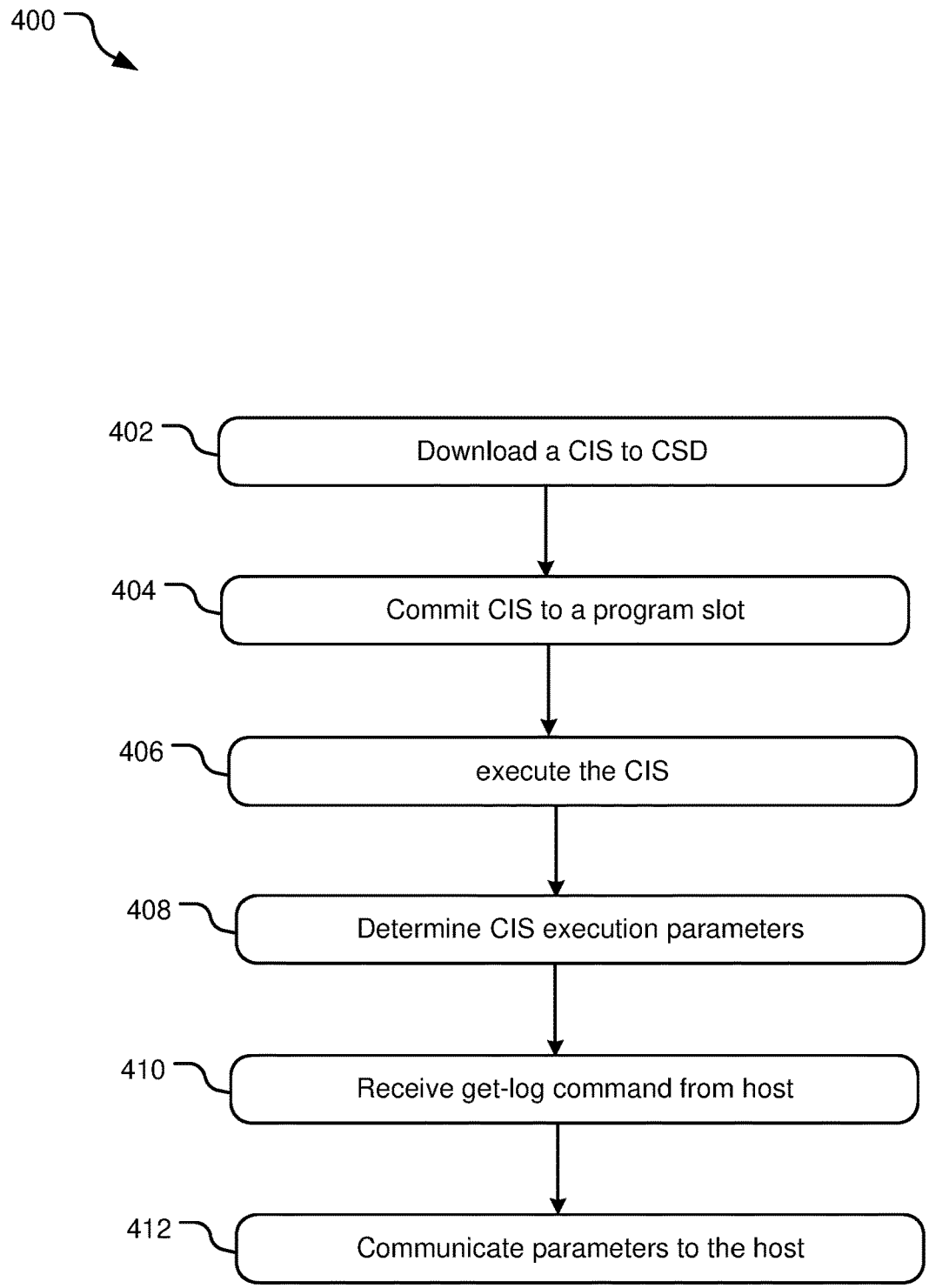
FIG. 4 illustrates alternative example operations for profiling performance of an embedded computing instruction set (CIS) on a computational storage device (CSD).

FIG. 4 illustrates operations 400 or profiling performance of an embedded computing instruction set (CIS) on a computational storage device (CSD). An operation 402 downloads a CIS to a CSD. The CSD may include a profiler including a profiling component with one or more instructions for monitoring the execution of the CIS to collect various CIS execution parameters. An operation 404 commits the CIS to a program slot in the CSD. Subsequently and in response to a CIS execute command, an operation 406 executes the CIS while monitoring the execution of the CIS by the profiling component of the profiler.

At operation 408, the profiling component determines various CIS execution parameters and stores such execution parameters in a parameter log. An operation 410 receives a get-log command from a host and in response, an operation 412 communicates the execution parameters to the host. Alternatively, at operation 412 the host may have direct access to the execution parameter log available to the host via a PCIe interface.

Figure 5:
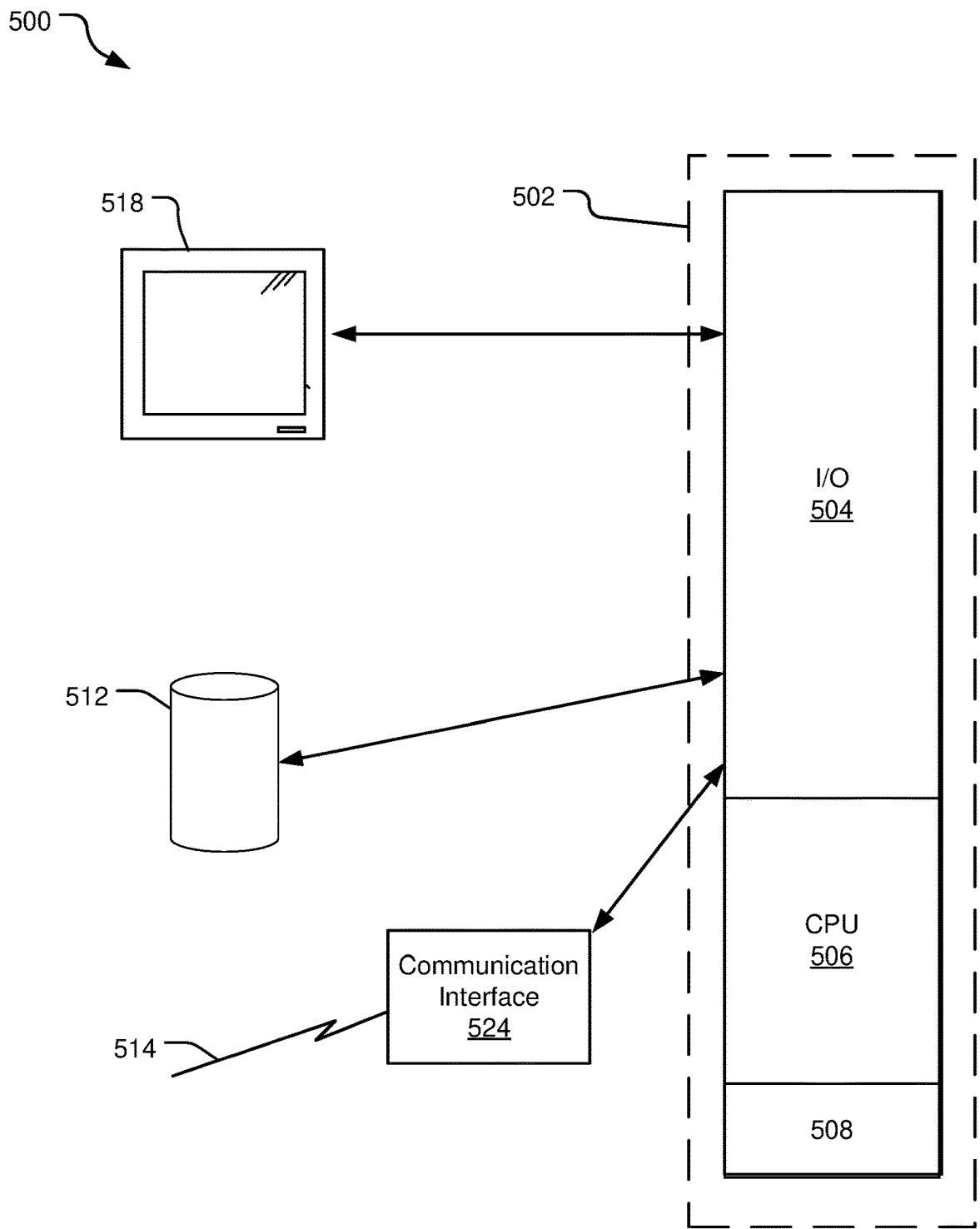
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   executing a computational instruction set (CIS) at a program slot in a computational storage processor of a computational storage device (CSD) having a profiler configured to measure one or more execution parameters of the CIS;
   generating a log of the execution parameters of the CIS;
   counting executed segments of the CIS to provide trace information;
   providing access to the log and the trace information;
   optimizing the CIS using the one or more execution parameters of CIS and the trace information;
   allocating the optimized CIS to native instruction slots; and
   generating a native instruction set based on the optimized CIS.

2. The method of claim 1, wherein the CIS is an enhanced Berkeley Packet Filter (eBPF) instruction set.

3. The method of claim 1, further comprising enabling CIS profiling using the profiler in response to receiving a non-volatile memory express (NVMe) set feature command from a host.

4. The method of claim 1, further comprising translating the CIS into a native instruction set before executing the CIS.

5. The method of claim 4, wherein the native instruction set is at least one of an advanced risc machines (ARM) instruction set and an RISC instruction set.

6. The method of claim 1, wherein the execution parameters include at least one of (a) total execution time of the CIS, (b) number of times each instruction of the CIS is executed, (c) percentage taken for every branch in the CIS, (d) number of dynamic random access memory (DRAM) memory accessed, and (e) cache utilization ratio.

7. The method of claim 1, wherein optimizing the CIS further comprising optimizing the CIS using profiling information of the CIS.

8. A system, comprising:
   a storage device;
   a non-volatile memory express (NVMe) interface to communicate with a host; and
   a computation system controller (CSC) to store one or more computer program instructions executable on a processor, the computer program instructions comprising:
   executing a computational instruction set (CIS) at a program slot in a computational storage processor of a computational storage device (CSD) having a profiler configured to measure one or more execution parameters of the CIS;
   generating a log of the execution parameters of the CIS;
   counting executed segments of the CIS to provide trace information;
   providing access to the log and the trace information via a peripheral component interconnect express (PCIe) interface;
   optimizing the CIS using the one or more execution parameters of CIS and the trace information; and
   generating a native instruction set based on the optimized CIS.

9. The system of claim 8, wherein the CIS is an enhanced Berkeley Packet Filter (eBPF) instruction set.

10. The system of claim 8, further comprising enabling CIS profiling using the profiler in response to receiving an NVMe set feature command from a host.

11. The system of claim 8, wherein the computer program instructions further comprising translating the CIS into a native instruction set before executing the CIS.

12. The system of claim 11, wherein the native instruction set is at least one of an advanced risc machines (ARM) instruction set and an RISC instruction set.

13. The system of claim 8, wherein the execution parameters include at least one of (a) total execution time of the CIS, (b) number of times each instruction of the CIS is executed, (c) percentage taken for every branch in the CIS, (d) number of dynamic random access memory (DRAM) memory accessed.

14. One or more non-transitory computer-readable storage media encoding computer-executable instructions for executing on a computer system a computer process, the computer process comprising:
   executing a computational instruction set (CIS) at a program slot in a computational storage processor of a computational storage device (CSD) having a profiler configured to measure one or more execution parameters of the CIS;
   generating a log of the execution parameters of the CIS;
   counting executed segments of the CIS to provide trace information;
   providing access to the log and the trace information via a peripheral component interconnect express (PCIe) interface; and
   optimizing the CIS using the one or more execution parameters of CIS and the trace information; and
   generating a native instruction set based on the optimized CIS.

15. The one or more non-transitory computer-readable storage media of claim 14, wherein the CIS is an enhanced Berkeley Packet Filter (eBPF) instruction set.

16. The one or more non-transitory computer-readable storage media of claim 14, wherein the computer process further comprising enabling CIS profiling using the profiler in response to receiving a non-volatile memory express (NVMe) set feature command from a host.

17. The one or more non-transitory computer-readable storage media of claim 14, wherein the computer process further comprising translating the CIS into a native instruction set before executing the CIS.

18. The one or more non-transitory computer-readable storage media of claim 17, wherein the native instruction set is at least one of an advanced risc machines (ARM) instruction set and an RISC instruction set.

19. The one or more non-transitory computer-readable storage media of claim 14, wherein the execution parameters include at least one of (a) total execution time of the CIS, (b) number of times each instruction of the CIS is executed, (c) percentage taken for every branch in the CIS, (d) number of dynamic random access memory (DRAM) memory accessed, and (e) cache utilization ratio.

20. The one or more non-transitory computer-readable storage media of claim 14, wherein optimizing the CIS further comprising optimizing the CIS using profiling information of the CIS.

\* \* \* \* \*